United States Patent
Gili et al.

(10) Patent No.: US 7,835,302 B2
(45) Date of Patent: Nov. 16, 2010

(54) METHOD AND APPARATUS FOR AUTOMATICALLY MANAGING SUB-LAYER INTERFACES

(75) Inventors: Patrick R. Gili, Bolton, MA (US); Jaime Antonio Colom, Round Rock, TX (US); Enid A. Jimenez, Round Rock, TX (US); Agrahara Sreenivasa Kiran Koushik, Boxborough, MA (US); Timothy James Swanson, Cambridge, MA (US); Leon Zachery, Wayland, MA (US)

(73) Assignee: Cisco Technology, Inc., San Jose, CA (US)

(*) Notice: Subject to any disclaimer, the term of this patent is extended or adjusted under 35 U.S.C. 154(b) by 1272 days.

(21) Appl. No.: 11/388,348

(22) Filed: Mar. 24, 2006

(65) Prior Publication Data

US 2007/0226326 A1     Sep. 27, 2007

(51) Int. Cl.
*H04L 12/28*    (2006.01)

(52) U.S. Cl. .................... 370/254; 370/389; 370/469; 709/223; 709/224

(58) Field of Classification Search ................. 370/254; 709/223, 224; 707/100
See application file for complete search history.

(56) References Cited

U.S. PATENT DOCUMENTS

| | | | |
|---|---|---|---|
| 6,219,705 B1 * | 4/2001 | Steinberger et al. | 709/224 |
| 6,725,233 B2 * | 4/2004 | Froyd et al. | 707/999.103 |
| 6,757,731 B1 * | 6/2004 | Barnes et al. | 709/227 |
| 7,260,621 B1 * | 8/2007 | Lavian et al. | 709/223 |

OTHER PUBLICATIONS

Cisco Technology, Inc., "Maximum Number of Interfaces and Subinterfaces for Cisco IOS Software Platforms: IDB Limits," http://www.cisco.com/warp/customer/63/idb_limit.html, accessed Aug. 11, 2005.
McCloghrie, K. et al., "The Interfaces Group MIB," published Jun. 2000, ftp://ftp.rfc-editor.org/in-notes/rfc2863.txt, accessed Jul. 25, 2006.
Mauro, Douglas and Schmidt, Kevin, "Chapter 2 A Closer Look at SNMP," published Jul. 2001, http://www.oreilly.com/catalog/esnmp/chapter/ch02.html, accessed Feb. 17, 2006.

* cited by examiner

*Primary Examiner*—Jayanti K Patel
*Assistant Examiner*—Matthew Campbell
(74) *Attorney, Agent, or Firm*—BainwoodHuang (57) ABSTRACT

A method of generating a standardized network-management representation of a multiple-layer network communications interface sub-stack having a non-standardized network-management representation includes determining, based on a signature indicating a layered structure of the network communications interface sub-stack, whether an expected type of sub-layer interface of the network communications interface sub-stack exists. If the expected type of sub-layer interface is determined not to exist, then a sub-layer interface of the expected type is created and a network management information base is populated with a sub-layer interface entry including (1) respective instance and type identifiers of the sub-layer interface and (2) one or more operational attributes of the sub-layer interface, the value of each operational attribute identically mirroring the value of a corresponding operational attribute of the interface sub-stack as reflected in the non-standardized network-management representation. The method can be performed for multiple sub-layer interfaces by a reentrant procedure of a dedicated interface manager in conjunction with pseudo drivers responsible for the sub-layer interfaces.

20 Claims, 5 Drawing Sheets

METHOD AND APPARATUS FOR AUTOMATICALLY MANAGING SUB-LAYER INTERFACES

BACKGROUND

The present invention is related to the field of data communications networks, and more particularly to data communications network management.

Network management encompasses a variety of activities with respect to communications networks, such as configuring, updating, monitoring and diagnosing network communications devices deployed within a network. In most instances the network communications devices, which are also referred to as "managed devices" herein, include hardware and software that supports these network management activities as well as an interface to a remote network management system of the managed network. While several such network management interfaces have been and continue to be used, one commonly used interface employs an open network management protocol known as the Simple Network Management Protocol (SNMP) along with a representation of network management data that conforms to an open specification known as the Structure of Management Information or SMI. Network management applications are deployed on a centralized network management system and engage in communications with the managed devices using the SNMP and SMI standards to carry out their network management tasks.

In particular, the SMI standards describe rules for writing abstract data collections referred to as Management Information Bases or MIBs. MIBs are specifications containing definitions of management information so that networked systems can be remotely monitored, configured, and controlled.

Although there are a wide variety of managed objects, for present purposes the focus is primarily on managed objects known as "interfaces". In the context of data communications generally, "interface" refers to a logical relationship between two entities that operate at different hierarchical layers of a layered communications scheme. Typically, an "interface" refers to a communication layer beneath the network layer in the 7-layer OSI model. In the case of a point-to-point protocol (PPP) session being carried by an Ethernet VLAN, for example, involves a virtual interface layered atop a physical Ethernet interface.

In the context of SNMP and SMI, there is much content and structure pertaining to interfaces that are defined in a managed device. For example, a typical MIB includes an interfaces table that enumerates all the interfaces in a managed device and includes a variety of information about each of them, including such things as an interface type, a description, a speed, an address, administrative and operational status, counts of packets transferred and errors, etc. Additionally, the manner in which interfaces are identified in a MIB is itself the subject of standardization—there is an official list of interface "types" that have been assigned by the Internet Assigned Names Authority (IANA), and network management applications operate in part based on the use of standard interface types in MIBs.

Another pertinent type of managed object is an interface "stack", which is a grouping of particular interfaces that together provide an interface between two entities that are separated in the hierarchical communications scheme. Continuing with the above example of a PPP session over an Ethernet VLAN, the virtual and physical interfaces are layered or "stacked" in that order.

It has been known to use a single data structure, referred to herein as an Interface Descriptor Block or IDB, to maintain various information pertaining to an "interface" as might be defined in a custom manner within a network communications device. Of particular pertinence here is the use of a single IDB by a software driver used in connection with an "interface" provided by a hardware interface module. A particular example might be a so-called "line card" for an optical communications link such as an Optical Carrier (OC)-x link, where x may have the value 8, 12, 48, etc. An internal interface provided by such a line card might be a single virtual tributary (VT) of a Synchronous Optical Network (SONET) connection, for example, and thus the "interface" may actually be a multi-layered interface including functionality at several hierarchical layers including a SONET Path layer and a SONET physical layer.

SUMMARY

Standards defining MIB modules for specific network interfaces typically describe how a particular type of network interface should relate to others in terms of interface stacking. As an example, one standard type of interface is a packet-over-SONET ('POS') interface, which is a packet-type of interface. It is expected from a standards perspective that a POS interface is part of an interface stack that also includes a SONET Path interface as well as a SONET physical-layer (line) interface. A network management application that is designed based on such an expectation may include corresponding internal dependencies. For example, if the network management application is tracing a communications path from end to end and collecting information about each interface along the way, upon discovering a POS interface it then looks for the underlying SONET Path and SONET physical layer interfaces that it expects. However, in the case that a managed device presents a multi-layered interface as a single managed object such as described above, the network management application will not be able to locate any of the underlying interfaces within the MIB for the managed device, because they are not present. The managed device is presenting the interface in a non-standard way to the network management application, and thus the network management application may not function correctly or provide usable results because its assumptions about the presentation of the network management information are not satisfied.

In accordance with the present invention, methods and apparatus are disclosed by which network management information can be presented in a standard way to a network management system by derivation from a non-standard representation maintained by a managed device, such as a single driver-maintained IDB for a multi-layered interface. The standards-related expectations of network management systems can be satisfied without requiring that software drivers for hardware interface modules themselves comply with the applicable network management standards. Thus, the disclosed techniques can be used in conjunction with existing drivers in a backwards-compatible manner, and can also be used even with new drivers to free the driver designer of the need to understand and comply with the pertinent network management standards.

According to a disclosed method, it is determined, based on a signature indicating a layered structure of a network communications interface "sub-stack", whether an expected type of sub-layer interface of the network communications interface sub-stack exists, and if not, then creating a sub-layer interface of the expected type and populating a network management information base with a sub-layer interface entry for the new sub-layer interface. Here, "sub-stack" refers to a set of two or more interfaces of an interface stack, and a sub-layer interface is an interface included within such a sub-stack. The sub-layer interface entry with which the network management information base becomes populated includes (1) respective instance and type identifiers of the sub-layer interface and (2) one or more operational attributes of the sub-layer interface, the value of each operational attribute identically mirroring the value of a corresponding operational attribute of the interface sub-stack as reflected in the non-standardized network-management representation. It should be noted that the term "sub-layer interface" as used herein typically refers to a representation used for network management purposes, rather than to the actual corresponding interface through which data communications packets are exchanged. As mentioned, actual sub-layer interfaces may be buried within a single monolithic driver, and it is desired to create an explicit representation of such actual sub-layer interfaces because the existence of such representations of sub-layers is required for support of relevant network management standards. The meaning of the term "sub-layer interface" in any particular usage herein should be clear in context.

In a further aspect, a disclosed method is performed by an interface manager in conjunction with software drivers including a real driver and a pseudo driver, the real driver being associated with the overall network communications interface sub-stack which effects the transfer of data communications packets in a network, and the pseudo driver being associated with the sub-layer interface, which does not effect the transfer of data communications packets in the network. The signature is provided to the interface manager by the real driver as part of registering the network communications interface sub-stack with the interface manager. The creating of the sub-layer interface is performed by the pseudo driver in response to a request from the interface manager, and it includes registering the sub-layer interface with the interface manager. The populating of the network management information base is performed by the interface manager as part of the registering of the sub-layer interface by the pseudo driver.

In yet another aspect, the functions of the interface manager are performed by a reentrant procedure and the determining, creating and populating steps are also performed for a second sub-layer interface of the network communications interface sub-stack, the populating step being performed by a second invocation of the reentrant procedure of the interface manager nested within a first invocation of the reentrant procedure.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 3 (consisting of FIGS. 3A, 3B and 3C) depicts various examples of multi-layered or "sub-stack" types of communications interfaces existing in a managed network device;

DETAILED DESCRIPTION

Figure 1:
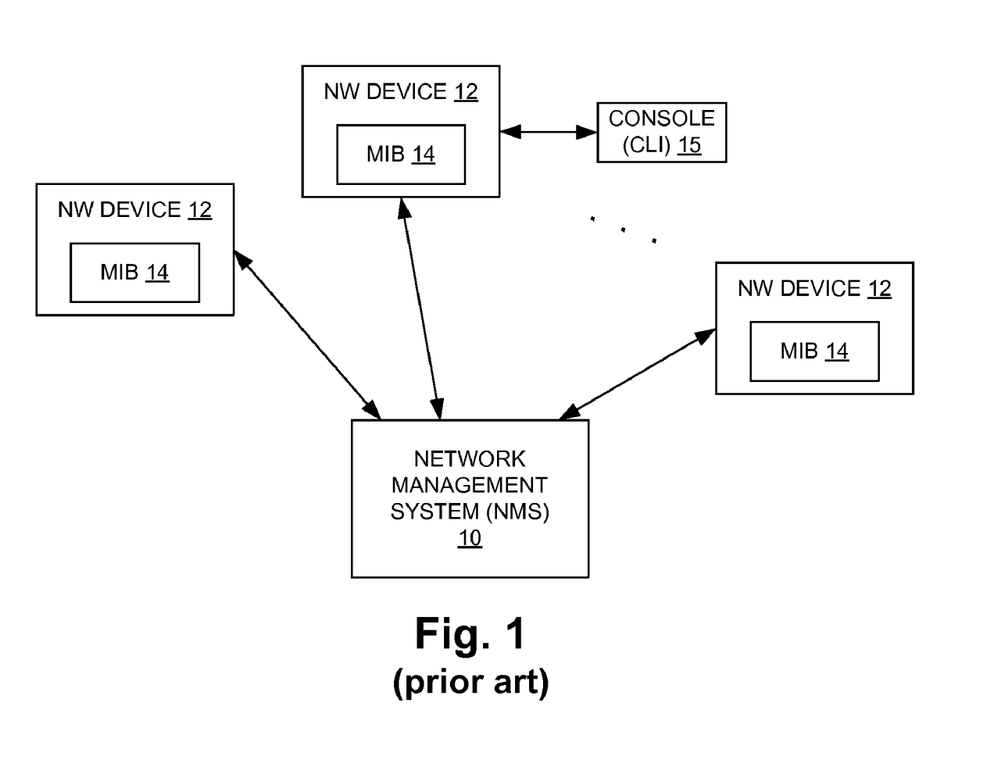
FIG. 1 is a block diagram of a data communications network including a network management system (NMS) and managed network devices.

FIG. 1 is a simplified depiction of a communications network from a network management perspective. A network management system (NMS) 10 is communicatively coupled to a plurality of managed network (NW) devices 12, which may include switches, routers, bridges, modems, etc. Each NW device 12 includes a respective management information base (MIB) 14 containing a variety of configuration and operational information about the respective NW device 12. The MIB 14 for a particular NW device 12 is not itself a physical data structure but rather a formalized, structured representation of data that may be distributed throughout the NW device 12. The NMS 10 can control and monitor the configuration and operation of each NW device 12 by writing data to and reading data from the corresponding MIB 14. In particular, the NMS 10 controls and monitors a variety of configuration and operational information concerning communications interfaces that exist within each NW device 12, as described in more detail below. FIG. 1 also shows that a local console 15 may be connected directly to a NW device 12 for purposes of local management. Because such consoles 15 often employ command-line interfaces (CLIs) rather than more elaborate graphical user interfaces, a console 15 is sometimes referred to as the "CLI" from the perspective of the NW device 12.

Figure 2:
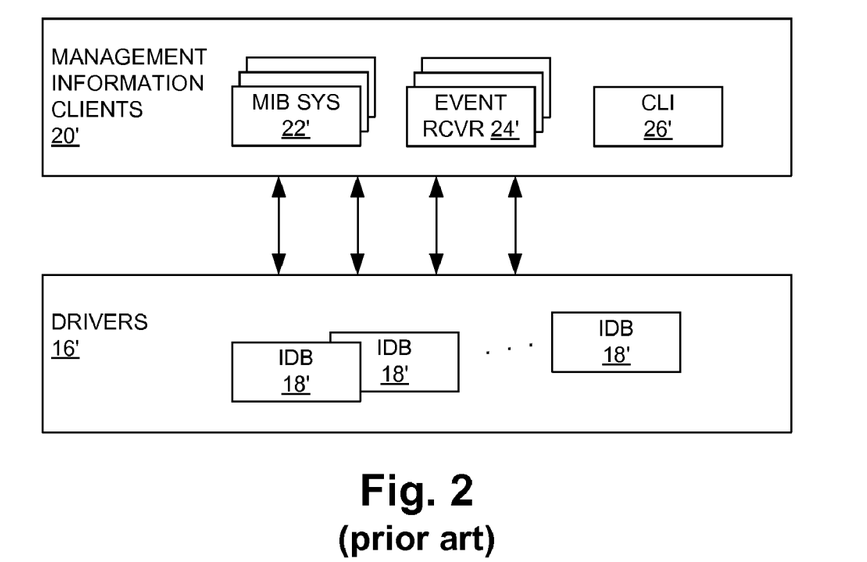
FIG. 2 is a block diagram depicting an organization of network management functions within a managed network device as known in the art.

FIG. 2 shows an arrangement of pertinent software entities within a NW device 12 as known in the art. Much of the data that is represented within a MIB 14, specifically interface-related data, is actually maintained by drivers 16' that execute within a NW device 12 to control the operation of the hardware interface modules for the physical communications ports of the NW device 12. Such modules are referred to as "physical layer interface modules" or "PLIMs" herein. A PLIM generally performs low-level, high-speed functions necessary to move data between a communications link (such as an Optical Carrier-12 (OC-12) link) and one or more high-speed data channels on a backplane or midplane of the NW device 12. The drivers 16' are part of an operating system executing within a NW device 12 to control its overall operation, including its interaction with the NMS 10. An example of such an operating system is the Internetwork Operating System (IOS) sold by Cisco Systems, Inc. The drivers 16' may maintain interface-related information in the form of interface description blocks (IDBs) 18', which are described in more detail below.

Also shown in FIG. 2 are a set of management information clients 20' that require access to the network-management-related information maintained by the drivers 16'. Examples of clients 20' include one or more MIB systems (MIB SYS) 22', one or more event receivers (EVENT RCVR) 24' and the interface to the console 15 (shown as CLI 26'). In operation, a client such as a MIB SYS 22' communicates with the drivers 16' to access the underlying data elements that are represented by the MIB variables exposed to the NMS 10. Thus, if the NMS 10 performs an SNMP GET of a MIB variable, the MIB SYS 22' of the NW device 14 responds by interrogating the appropriate driver 16' and/or IDB 18' to read the actual data value represented by the MIB variable, such as a packet counter, interface description, etc.

In the prior-art configuration depicted in FIG. 2, the clients 20' are essentially in direct communication with the drivers 16' for purposes of accessing network management information including the information maintained within the IDBs 18'. This organization is problematic from several perspectives. Development of new drivers 16' and/or clients 20' may be unduly complicated, for example because the burden of managing MIB data falls too heavily on driver developers who are not familiar with the detailed operation of network management. Also, existing clients 20' and drivers 16' may not adequately support functional and compliance testing of the MIBs 14 that they support. Existing software has also come to include numerous dependencies on particular types of NW devices 12 and/or particular types of PLIMs, making it increasingly difficult to migrate to new MIB definitions as well as to diagnose operational problems when existing MIBs are in use. These problems can manifest themselves in the form of conformance and consistency issues that negatively affect the development and deployment of network management applications and that can increase the cost to a manufacturer of product support for the NW devices 12. The presently disclosed methods and apparatus address these problems by introducing an explicit interface manager as described below which provides for normalized access to interface-related network management data. The interface manager can be implemented as a common part and interface-specific extensions for implementation efficiency, and can have specific support for "legacy" drivers 16' that have not been designed or adapted for use with the interface manager.

The interfaces-related data in the MIB 14 resides in several particular sub-structures, all of which are part of an "interfaces group" defined in the MIB standards, such as Request for Comments (RFC) 2863. An "interfaces table" represents all the interfaces of a NW device 14 as a sequence of "interface entries", each of which in turn is a collection of a variety of data elements for a particular interface. These data elements include things such as an index (unique identifier), description, type, address, status, operational variables, etc. It should be noted that interface types are subject to textual conventions defined by an interface type MIB published by the Internet Assigned Names Authority (IANA). The interfaces group also includes an "interface stack table" which describes the interface stacks within the scope of managed entity such as a NW device 14. Each conceptual row in this table describes a connection in a graph representing an interface stack. Each table entry identifies a connection by a pair of interface indexes, one representing a "superior" (higher level) interface and the other representing a "subordinate" (lower-level) interface, in the order specified. Thus, a connection flows from superior to subordinate interface. The interface stack table can be used by network management software to identify the stack relationships of interfaces, which can be useful for certain types of operations, including path-tracing and isolation during the process of diagnosing operational problems. There is also an "inverted" interface stack table which describes the same interface-stack graph using entries that have the interface indexes lexically reversed, making it easier for network management software to traverse the graph from bottom to top when necessary.

Historically, driver objects representing interfaces often do not cleanly map to the notion of an interface as defined by the interfaces MIB and interface-specific MIBs. Consider an interface on an OC-12 Packet-Over-SONET (POS) PLIM configured to use a High-Level Data Link Control (HDLC) type of encapsulation. An interface driver for such a POS PLIM might maintain a single IDB 18' containing information at the encapsulated packet level, the SONET Path level, and the SONET physical layer. A standardized interface type that might be selected for this OC-12 POS interface would necessarily be incomplete and/or misleading, because it would not capture the non-standard multiple-layer structure. This contrasts with the expectations of the interfaces MIB and a specific SONET MIB known as SONET-MIB, which together mandate an interface stack having three distinct MIB-identified interfaces, namely a topmost POS interface, a next-layer SONET Path interface, and a bottom-most SONET physical layer interface.

Figure 3A:
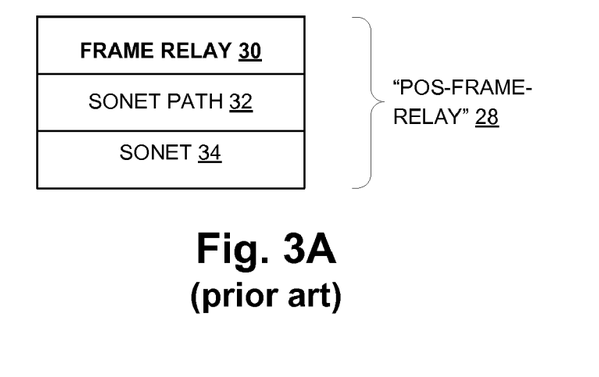
Figure 3B:
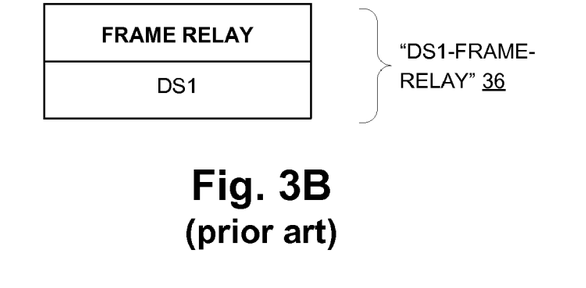
Figure 3C:
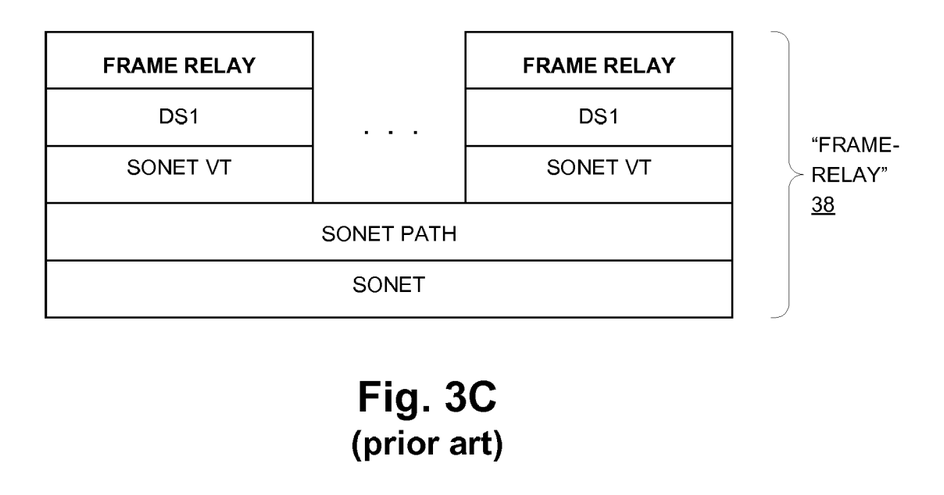

It can be generalized that driver objects representing such non-standard, multi-layered interfaces map to interface "sub-stacks" rather than to a single interface. In the above example, the IDB 18' representing the OC-12 POS interface can be mapped to an interface sub-stack including distinct POS, SONET Path, and SONET physical-layer interfaces, where each of these is a standardized IANA interface type. FIGS. 3A, 3B and 3C illustrate several examples of such mappings. FIG. 3A shows the structure of an interface object 28 that has the non-standard type POS-FRAME-RELAY. This object might be presented, for example, by an interface driver for a port of an OC-12 POS PLIM that employs frame relay encapsulation. As shown, the POS-FRAME-RELAY object 28 actually includes functionality at three different layers, including a frame relay encapsulation layer 30, a SONET path transport layer (SONET PATH) 32, and a SONET line or physical layer (SONET) 34. FIG. 3B illustrates an interface object 36 that may be created for a T1 (DS1) PLIM that provides frame relay encapsulation, and thus may be identified as the non-standard type DS1-FRAME-RELAY. FIG. 3C shows an interface object 38 that may represent the use of frame relay, DS1 and SONET virtual tributaries (VTs) of a channelized OC-12 PLIM and having the non-standard type SERIAL-FRAME-RELAY.

In all three cases of FIG. 3, the topmost layer is FRAME RELAY and thus each interface object 28, 36 and 38 might be represented in a prior-art network management environment as being of the standardized type FRAME RELAY. Such a common identification of very different multi-layered interfaces can present problems for network management applications that attempt to operate according to published standards.

It will be noted in the foregoing description that a distinction is drawn between the type of each multi-layered interface (such as the POS FRAME RELAY type of interface object 28) and the type of each sub-layer (e.g., SONET Path layer 32), which is standardized. In accordance with the presently disclosed technique, the non-standard terms POS FRAME RELAY, DS1-FRAME-RELAY, and SERIAL-FRAME-RELAY are taken to be "signatures" of the respective multi-layered interface objects. These signatures are used as described below to create explicit representations of all the standard-type sub-layers. The resulting MIB representations of these interface objects are compliant with the relevant standards, so that the operational assumptions of network management applications are satisfied and the applications perform better. The use of interface signatures in this manner allows a network device to guarantee the representation of all standard required interfaces with respect to network management.

Figure 4:
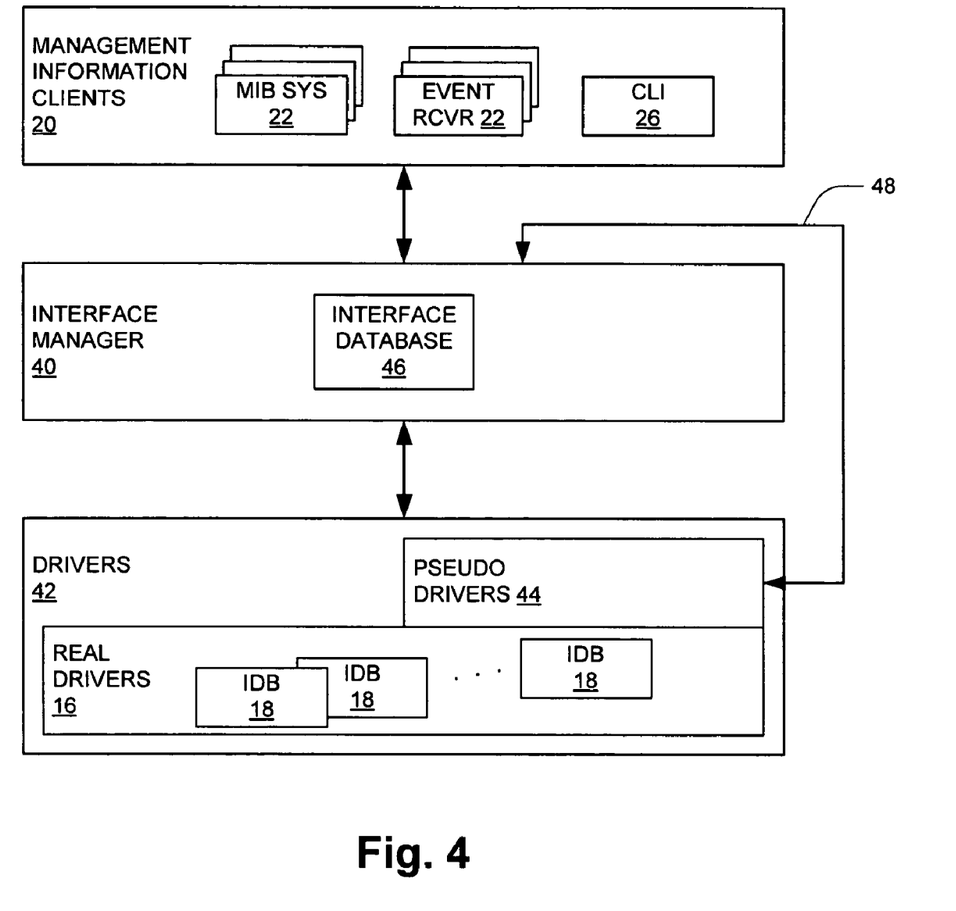
FIG. 4 is a block diagram depicting an organization of network management functions within a managed network device in accordance with the present invention.

FIG. 4 shows an improved organization of the functions/software pertaining to the management of interfaces in a managed system such as that of FIG. 1. An explicit interface manager 40 is interposed between a set of clients 20 and a set of drivers 42. The drivers 42 are divided into two types referred to for convenience herein as "real" drivers 16 and "pseudo" drivers 44. The real drivers 16 are similar to drivers 16' of FIG. 2, i.e., they control the operation of real hardware and/or software interfaces that transmit and receive data communications packets. The real drivers 16 include corresponding IDBs 18 represented by associated "signatures" such as described above. The pseudo drivers 44 are used in the creation, destruction and use of pseudo interfaces that are used to provide a more standardized view of the NW devices 12 from a network-management perspective, to avoid the type of problems described above with reference to FIG. 2. The actual implementation of any real driver 15 or pseudo driver 44 will generally depend on the particular operating system with which it operates.

The interface manager 40 maintains an interface database 46 and acts as a common control point between the management clients 20 and the drivers 42. It exposes a set of client services to the management clients 20 for the purpose of retrieving and modifying managed data associated with interfaces. It also exposes a set of driver services to the interface drivers 42 for the purpose of creating/destroying interfaces, retrieving managed data, validating and modifying configuration data, posting status, and signaling events and alarms. The interface manager 40 depends on the pseudo drivers 44 to manage sub-layer interfaces as described in more detail below.

With respect to the interface manager 40, any pseudo driver 44 behaves very much like any real driver 16, with the exception that the interface(s) handled by each pseudo driver 44 do(es) not transmit or receive packets. One other potential distinction between the pseudo drivers 44 and the real drivers 16 is that the pseudo drivers 44 may interact with the interface manager 40 in a client-like manner as indicated by connection 48. This operation is described in more detail below.

The drivers 42 are all included within the operating system of the NW device 12 in a conventional fashion, e.g. as part of a bootstrapping process and/or in a "plug and play" fashion upon insertion of a PLIM. The interface types of the pseudo drivers 44 generally conform to published standards such as the above-mentioned IANA types (SONET, SONET Path, etc.). For reasons described below, the interface "signatures" used by each real driver 16 (e.g. POS driver 16-1) must generally be unique across a particular operating system implementation.

Figure 5:
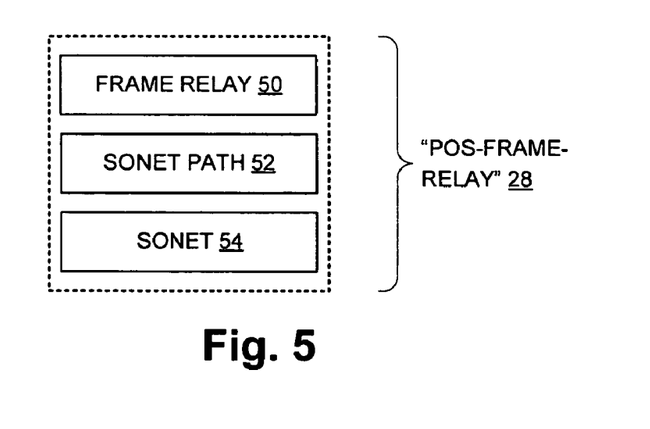
FIG. 5 is a diagram depicting a multi-layered interface including explicitly defined sub-layer interfaces using the organization of network management functions of FIG. 4.

FIG. 5 illustrates an exemplary outcome of the combined operations of the interface manager 40 and drivers 42 (including pseudo drivers 44) as described below. A multiple-layer interface object 28 having a signature of POS-FRAME-RELAY, for example, is represented within a MIB 14 as three distinct, standard-type interfaces. The topmost interface 50 of type FRAME RELAY is maintained by a real driver 16 that actually implements all the packet-moving functionality of the entire POS-FRAME-RELAY object 28. Also included are a SONET Path pseudo interface 52 and a SONET (physical layer) pseudo interface 54 that are utilized for network management purposes only. In particular, the pseudo interfaces 52 and 54 provide a standardized "sub-stack" representation of the multi-layered object 28 that is much more consistent with the needs and expectations of standard network management applications such as might be used in the network management system 10 (FIG. 1).

Figure 6:
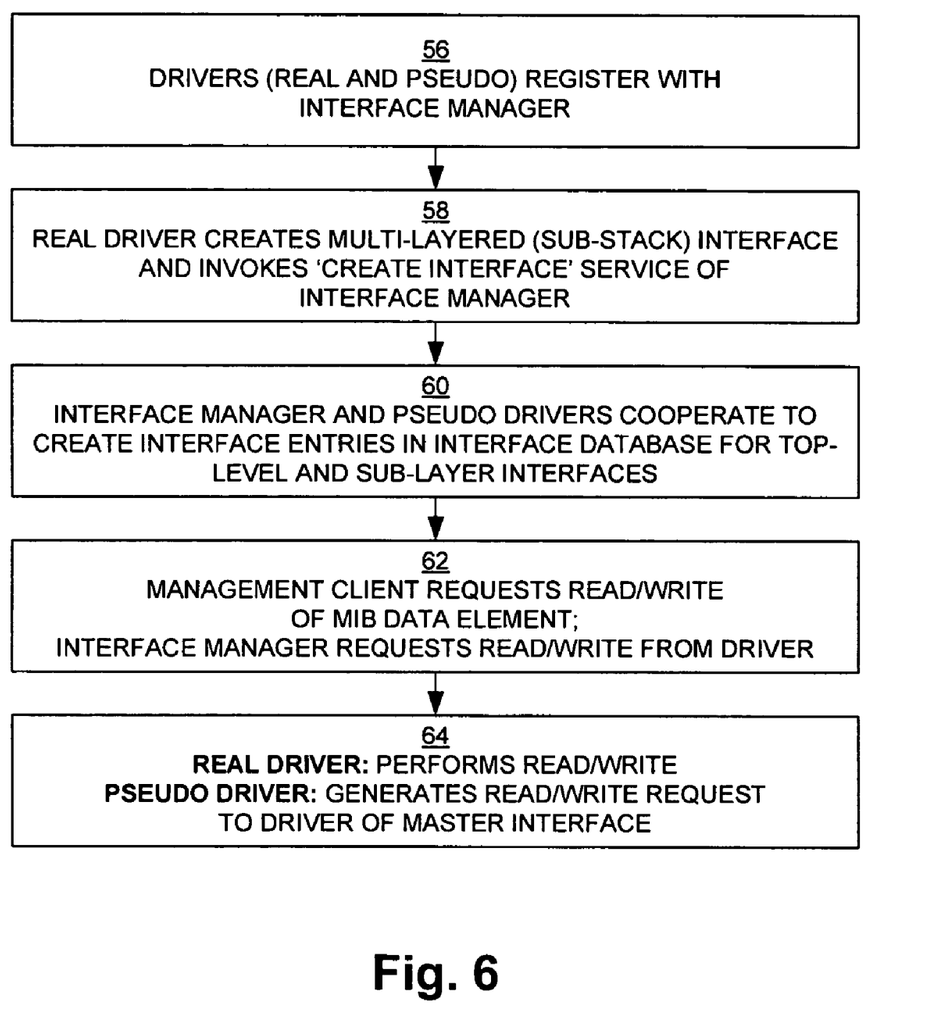
FIG. 6 is a flow diagram showing the overall operation of the organization of network management functions of FIG. 5.

FIG. 6 illustrates the process by which network management information is made accessible and actually accessed using the organization shown in FIG. 4. In step 56, the drivers 42 (including both the real drivers 16 and the pseudo drivers 44) register with the interface manager 40. By this registration the interface manager 40 becomes aware of the existence and type of each driver 42 as well as how to communicate with it. In step 58, a real driver 16 creates a multi-layered or sub-stack type of interface, such as the POS-FRAME-RELAY interface 28, and invokes a "Create Interface" service of the interface manager 40. These actions may occur, for example, when a boot process of the NW device 12 invokes a POS real driver 16 to create a static interface corresponding to its physical ports supported by the NW device 12. Alternatively, the insertion of a PLIM may invoke the POS real driver 16 to create static interface(s) corresponding to physical port(s) supported by the PLIM.

When invoking the Create Interface service of the interface manager 40, a driver 42 provides the following information:

Interface Handle—an opaque value uniquely identifying the interface being created. This value will typically be a reference to the driver object representing the interface.

Master Interface—the interface index of the interface functioning as the "master" of the interface being created. The concept of a master interface is described below.

Interface Signature—an opaque value uniquely identifying the type of multi-layered or sub-stack interface being created (e.g., POS-FRAME-RELAY).

Interface Name—a descriptive string assigned to the interface by the CLI 15 (FIG. 1).

Interface Description—a string assigned to the interface by the system. The interface manager 40 requires this value to be globally unique and persistent across restarts.

Subordinate Interface—the interface index associated with the interface that is "subordinate" to the interface being created, i.e., beneath this interface in the sub-stack (if one exists).

Note that it is assumed that drivers 42 create interface stacks in a bottom-up manner, i.e., they create lower-level interfaces first and then build up higher-level interfaces.

In step 60 of FIG. 6, the interface manager 40 and the pseudo drivers 44 cooperate to create interface entries in the interface database 46 for the interface being created. These interface entries are available as MIB objects to the MIB clients 22, and are also available to other types of clients 20. In the case of a sub-stack type of interface, there will be interface entries for the top-level interface (e.g. FRAME RELAY 50 of FIG. 5) and the sub-layer interfaces (e.g. SONET Path 52 and SONET 54) as necessary. The details of this cooperative operation are described below.

In step 62, a management client 20 requests a read or write of a MIB data element, for example in response to an SNMP GET or SET command issued by the NMS 10 of FIG. 1. The interface manager 40 responds by forwarding the request to the appropriate driver 42. In step 64, the driver 42 responds by satisfying the request. In the case of a real driver 16 which actually maintains the data underlying the MIB data element, it can either update the data (in the case of a write) or return the data to the interface manager 40 for forwarding on to the requesting client 20 (in the case of a read). The operation of a pseudo driver 44 involves a level of indirection as now described.

As mentioned above, the sub-layer interfaces maintained by pseudo drivers 44 do not transmit or receive packets. Thus, the sub-layer interfaces by their nature are not represented in exactly the same way as are real interfaces. The representation of sub-layer interfaces relies in part on the notion of a "master" interface, which is used by a pseudo driver 44 to derive a representation of a sub-layer interface. As an example, a pseudo driver 44 can equate the operational status of a sub-layer SONET path to that of the master POS interface. More specifically, the pseudo driver 44 may derive the SONET path's operational status from the driver object (e.g., a IDB 18) representing the interface sub-stack of which the sub-layer interface is a part.

In some cases, the master interface may be the top-most interface in the interface sub-stack containing the sub-layer interface. This would be the case in the examples of FIG. 3. In other cases, the master interface may be the subordinate interface to the interface sub-stack. For example, it may be desirable for the pseudo driver 44 to equate the operational status of a SONET path to that of the underlying SONET physical layer interface. More specifically, the pseudo driver derives the SONET path's operational status from the driver object (IDB 18) representing the SONET physical layer interface. There may be a variety of approaches that a pseudo driver 44 might use to derive a representation for a pseudo interface. As a general matter, the interface index for a pseudo interface should not be in any way dependent on a master interface; interface indexes should be allocated and managed for pseudo interfaces in the same way as for real interfaces. The interface type will be that of the sub-layer, e.g. SONET Path. Data elements such as the interface description and operational status might simply be equal to the corresponding values of the master interface, or in appropriate cases a null value.

The interface manager 40 can query the pseudo driver 44 for managed data relating to a pseudo interface through an Interface Data Get function that is registered by the pseudo driver 44. In supporting this function, the pseudo driver 44 may need to derive certain managed data from elsewhere, as discussed above, and in such cases requires access to managed data maintained by the associated master interface. A pseudo driver 44 can obtain access to this managed data in one of two ways:

1. Client Services of the Interface Manager 40—This is the connection 48 in FIG. 4 in which the pseudo drivers 44 act as clients of the interface manager 40. That is, a pseudo drive 44 can request access to data maintained by a real driver 16 in the same manner as the clients 20. These services might be the most straightforward to employ. However, they add to the overhead of the interface manager 40 and may present a performance issue.
2. Driver Callbacks—The pseudo drivers 44 may have access to "callback" functions of the real drivers 16 that provide a direct method for accessing managed data relating to the master interface. To utilize such a technique, a pseudo driver 44 must identify the real driver 16 maintaining the master interface and the signature of the master. Second, the pseudo driver 44 needs to determine the appropriate callbacks. Finally, to use these callbacks, the pseudo driver 44 must determine the interface handle of the master interface. All of these actions can be supported by providing appropriate services within the system.

Figure 7:
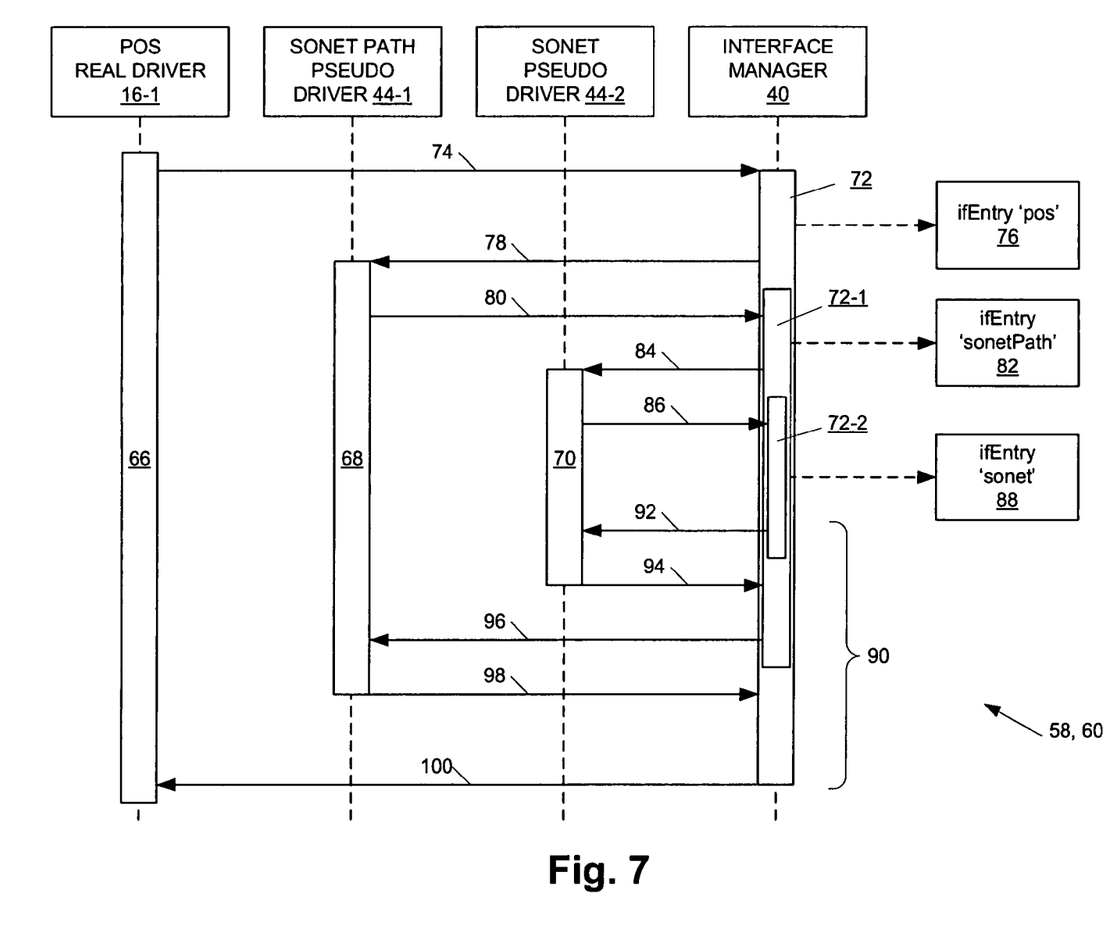
FIG. 7 is a diagram illustrating part of the operation of FIG. 6 having an iterative, reentrant characteristic.

FIG. 7 illustrates the detailed operation of steps 58 and 60 of FIG. 6 for a specific example, namely the layered POS-FRAME-RELAY interface 28 of FIG. 5. At the top are shown the interface manager 40 as well as three drivers 42: a POS real driver 16-1, a SONET Path pseudo driver 44-1, and a SONET pseudo driver 44-2. Time progresses in the vertical downward direction, and thus the operation of each driver 16-1, 44-1, 44-2 and the interface manager 40 is shown in a corresponding vertically oriented operation box 66, 68, 70, and 72. The operation box 72 of the interface manager 40 includes sub-boxes 72-1 and 72-2 for reasons described below.

Interface creation starts with the POS real driver 16-1, as described above with reference to step 58 of FIG. 6. After the POS driver 16-1 has created or initialized the IDB 18 for a POS-FRAME-RELAY interface, the following operations ensue:

1. The POS interface driver 16-1 invokes a Create Interface service of the interface manager 40 (shown at 74).
2. The interface manager 40 creates an interface entry 76 in the MIB interfaces table with a standardized IANA type of 'pos'. This entry corresponds to the frame relay interface 50 of FIG. 5. As part of this operation, the interface manager 40 allocates an interface index to the new interface entry.
3. The interface manager 40 then determines whether it is necessary to create any sub-layer interfaces to provide the standardized MIB representation that may be needed by the clients 20. The details of this determination are described below. If no sub-layer interface is needed, then the interface manager 40 merely returns the value of the interface index to the requestor for its future use in accessing the interface entry. If one or more sub-layer interfaces is needed, then the interface manager 40 initiates the creation of such sub-layer interfaces. In the example of FIG. 7, sub-layer interfaces for the SONET Path and the SONET physical layer (SONET) are required, and thus the interface manager 40 proceeds to have them created.
4. In the example of FIG. 7, the interface manager 40 first invokes the SONET Path sub-layer interface pseudo driver 44-1 (operation box 68) to create a sub-layer pseudo interface to represent the SONET Path underlying the frame relay interface 50. This operation is indicated at 78.
5. The SONET path sub-layer interface pseudo driver 44-1 creates a sub-layer pseudo interface, which as mentioned above has all the attributes of a real interface except that it does not handle packet traffic. Part of the creation of the sub-layer pseudo interface is to establish how it will be represented to the MIB clients 20, as discussed above with reference to FIG. 6. Then as shown at 80, the SONET Path pseudo driver 44-1 invokes the Create Interface service of the interface manager 40 in order to register this new interface with the network management system. Note that this action represents a reentrance into the interface manager 40—the Create Interface service of the interface manager 40 is being invoked again before the first invocation 74 has completed. Thus, the Create Interface service of the interface manager 40 is preferably implemented in a reentrant manner to support the iterative creation of sub-layer pseudo interfaces.
6. This first reentrance into the interface manager 40 is indicated by operation box 72-1. As part of this operation, the interface manager 40 creates an interface entry 82 in the MIB interfaces table with a standardized IANA type of 'sonetPath'. This entry corresponds to the SONET Path sub-layer interface 52 of FIG. 5.
7. The above steps 4-6 are now repeated for the SONET sub-layer interface 54 of FIG. 5. The operations are indicated at 84 and 86 and the resulting interface entry at 88. It will be appreciated that the operation box 72-2 represents a second reentrance into the interface manager 40 and the deepest level of nesting or iteration of the overall process.
8. As generally indicated at 90, the interface manager 40 and the various drivers 16-1, 44-1 and 44-2 then "unwind" from the nesting. Specifically, at 92 the interface manager 40 passes an interface index for the SONET interface entry 88 to the SONET pseudo driver 44-2 for its future use in accessing the interface entry 88. At this point the operations of the interface manager 40 represented by operation box 72-2 are complete. At step 94 the SONET pseudo driver 44-2 provides an indication to the interface manager 40 that the SONET sub-layer interface 54 has been created. This indication is handled in the context of operation box 72-1 of the interface manager 40. Specifically, the interface manager 40 now creates a stack relationship between the SONET interface entry 88 and the SONET Path interface entry 82, by making an appropriate addition to the interfaces stack table of the MIB 14. At 96 and 98, operations are performed between the interface manager 40 and the SONET Path pseudo driver 44-1 that are analogous to the operations 92 and 94 respectively, and after which the interface manager 40 makes an analogous addition to the interfaces stack table to create a stack relationship between the SONET Path interface entry 82 and the POS interface entry 76. At 100 the interface manager 40 passes the interface index for the POS interface entry 76 to the POS real driver 16-1 for its future use in accessing the interface entry 76, and the entire interface creation process is complete.

As mentioned above, part of the operation of the Create Interface service of the interface manager 40 is to determine whether there is a sub-layer interface that should be created. It does this based on the signature of the interface being created as well as the type of subordinate interface as reported by the requesting driver. If the subordinate interface is of an appropriate type based on the interface signature, then no sub-layer interface is needed. But if the subordinate interface is an inappropriate type, indicating that a required sub-layer is missing, then the interface manager 40 takes steps to have the missing sub-layer interface created. It should be noted that the driver 42 may use a "null" value to indicate that there is no subordinate interface. Whether the subordinate interface is "appropriate" is dependent on the interface signature or type. Recall that a POS-FRAME-RELAY sub-stack, for example, should include frame relay, SONET path, and SONET sub-layers. If a driver 42 creates a POS-FRAME-RELAY interface and reports a null subordinate interface, this indicates to the interface manager 40 that the SONET path and SONET sub-layer interfaces are missing. When interface sub-stacks have been properly formed as described herein, only the lowest-level pseudo interface (e.g., SONET) properly has a null value for its subordinate interface. In the process of FIG. 7, the invocation 74 by the POS driver 16-1 will have an inappropriate null value for the subordinate interface, which indicates to the interface manager that there are missing sub-layers. In contrast, the invocation 86 by the SONET pseudo driver 44-2 has an appropriate null value—the SONET sub-layer 54 is a physical layer and thus should have no subordinate interfaces—and thus the interface manager 40 can conclude in response that no additional sub-layers are needed.

As mentioned above, the interface manager 40 may be implemented as a common part and a plurality of "extensions", where the common part supports generic operations (such as providing access to packet counters) and the extensions support operations that are more specific to particular interface types. In such a case, there is necessarily a software interface (application programming interface or API) between the common part and the extensions for purposes of signaling the forwarding of requests to the extensions and the return of results by the extensions. In particular, the common part may be the primary actor responding to a Create Interface request of a driver 42 for purposes of registering a newly created interface and determining whether any sub-layer interfaces are to be created. In the case that a sub-layer interface is needed, then the common part would signal the appropriate extension, which would in turn invoke the appropriate pseudo driver. The subsequent reentrance into the interface manager 40 by the pseudo driver would be via the extension in the first instance, which would then signal back up to the common part.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of operating a network communications device to provide a standardized network-management representation of a multiple-layer network communications interface sub-stack having a non-standardized network-management representation, the multiple-layer network communications interface sub-stack being a set of two or more interfaces of a multi-layered interface stack of one or more drivers for a hardware data communications interface of the network communications device, comprising:

based on a signature indicating a layered structure of the network communications interface sub-stack, determining whether an expected type of sub-layer interface of the network communications interface sub-stack exists; and if the expected type of sub-layer interface is determined not to exist, then creating a sub-layer interface of the expected type and populating a network management information base with a sub-layer interface entry, the management information base being stored in memory of the network communications device so as to be accessible to network management client applications performing network management functions with respect to the network communications device, the sub-layer interface entry including (1) respective instance and type identifiers of the sub-layer interface and (2) one or more operational attributes of the sub-layer interface, the value of each operational attribute identically mirroring the value of a corresponding operational attribute of the interface sub-stack as reflected in the non-standardized network-management representation.

2. A method according to claim 1 performed by an interface manager in conjunction with drivers including a real driver and a pseudo driver, the real driver being associated with the overall network communications interface sub-stack which effects the transfer of data communications packets in a network, the pseudo driver being associated with the sub-layer interface which does not effect the transfer of data communications packets in the network, and wherein:

the signature is provided to the interface manager by the real driver as part of registering the network communications interface sub-stack with the interface manager;

the creating of the sub-layer interface (1) is performed by the pseudo driver in response to a request from the interface manager, and (2) includes registering the sub-layer interface with the interface manager; and the populating of the network management information base is performed by the interface manager as part of the registering of the sub-layer interface by the pseudo driver.

3. A method according to claim 2, wherein:

the sub-layer interface is a first sub-layer interface and the populating of the network management information base is performed by a first invocation of a reentrant procedure of the interface manager; and the determining, creating and populating are also performed for a second sub-layer interface of the network communications interface sub-stack, the populating for the second sub-layer interface being performed by a second invocation of the reentrant procedure of the interface manager nested within the performing of the first invocation of the reentrant procedure.

4. A method according to claim 2, wherein the interface manager includes a common part and an extension part whose operation is specific to a type of the sub-layer interface, and wherein the request from the interface manager for the creating of the sub-layer interface is made by the extension part in response to a command from the common part.

5. A method according to claim 2, wherein the standardized network-management representation of the multiple-layer network communications interface is accessed by network management clients via client services provided by the interface manager, and wherein the value of each operational attribute of the sub-layer interface is made to identically mirror the value of the corresponding operational attribute of the interface sub-stack as reflected in the non-standardized network-management representation by the pseudo driver accessing, via the client services of the interface manager, data maintained by the real driver.

6. A method according to claim 2, wherein the value of each operational attribute of the sub-layer interface is made to identically mirror the value of the corresponding operational attribute of the interface sub-stack as reflected in the non-standardized network-management representation by the pseudo driver directly interacting with the real driver to access data maintained by the real driver.

7. A method according to claim 2, wherein determining whether an expected type of sub-layer interface of the network communications interface sub-stack exists is performed based on the signature and a type of a subordinate interface reported to the interface manager by the real driver.

8. A network communications device operative to provide a standardized network-management representation of a multiple-layer network communications interface sub-stack having a non-standardized network-management representation, the multiple-layer network communications interface sub-stack being a set of two or more interfaces of a multi-layered interface stack of one or more drivers for a hardware data communications interface of the network communications device, the network communications device having processing circuitry including a memory and a processor operative to store and execute software comprising:

an interface manager; and a plurality of drivers including a real driver and a pseudo driver, the real driver being associated with the network communications interface sub-stack which effects the transfer of data communications packets in a network, the pseudo driver being associated with a sub-layer interface type which does not effect the transfer of data communications packets in the network;

wherein:

the interface manager is operative, based on a signature provided by the real driver indicating a layered structure of the network communications interface sub-stack, to determine whether an expected type of sub-layer interface of the network communications interface sub-stack exists; and the interface manager and pseudo driver are co-operative, if the expected type of sub-layer interface is determined not to exist, to create a sub-layer interface of the expected type and to populate a network management information base with a sub-layer interface entry, the management information base being stored in the memory so as to be accessible to network management client applications performing network management functions with respect to the network communications device, the sub-layer interface entry including (1) respective instance and type identifiers of the sub-layer interface and (2) one or more operational attributes of the sub-layer interface, the value of each operational attribute identically mirroring the value of a corresponding operational attribute of the interface sub-stack as reflected in the non-standardized network-management representation.

9. A network communications device according to claim 8 wherein:

the signature is provided to the interface manager by the real driver as part of registering the network communications interface sub-stack with the interface manager;

the creating of the sub-layer interface (1) is performed by the pseudo driver in response to a request from the interface manager, and (2) includes registering the sub-layer interface with the interface manager; and the populating of the network management information base is performed by the interface manager as part of the registering of the sub-layer interface by the pseudo driver.

10. A network communications device according to claim 9, wherein:

the sub-layer interface is a first sub-layer interface and the populating of the network management information base is performed by a first invocation of a reentrant procedure of the interface manager; and the interface manager and a second pseudo driver are co-operative to repeat the determining, creating and populating for a second sub-layer interface of the network communications interface sub-stack, the populating for the second sub-layer interface being performed by a second invocation of the reentrant procedure of the interface manager nested within the performing of the first invocation of the reentrant procedure.

11. A network communications device according to claim 9, wherein the interface manager includes a common part and an extension part whose operation is specific to a type of the sub-layer interface, and wherein the request from the interface manager for the creating of the sub-layer interface is made by the extension part in response to a command from the common part.

12. A network communications device according to claim 9, further comprising network management clients operative to access the standardized network-management representation of the multiple-layer network communications interface via client services provided by the interface manager, and wherein the pseudo driver is operative to access, via the client services of the interface manager, data maintained by the real driver so as to make the value of each operational attribute of the sub-layer interface identically mirror the value of the corresponding operational attribute of the interface sub-stack as reflected in the non-standardized network-management representation.

13. A network communications device according to claim 9, wherein the pseudo driver is operative to directly interact with the real driver to access data maintained by the real driver so as to make the value of each operational attribute of the sub-layer interface identically mirror the value of the corresponding operational attribute of the interface sub-stack as reflected in the non-standardized network-management representation.

14. A network communications device according to claim 9, wherein the interface manager is operative to determine whether an expected type of sub-layer interface of the network communications interface sub-stack exists is performed based on the signature and a type of a subordinate interface reported to the interface manager by the real driver.

15. A computer program product comprising a non-transitory computer-readable medium having computer instructions stored thereon, the computer instructions being operative when executed by a network communications device to cause the network communications device to perform a method of providing a standardized network-management representation of a multiple-layer network communications interface sub-stack having a non-standardized network-management representation, the multiple-layer network communications interface sub-stack being a set of two or more interfaces of a multi-layered interface stack of one or more drivers for a hardware data communications interface of the network communications device, the method including:

based on a signature indicating a layered structure of the network communications interface sub-stack, determining whether an expected type of sub-layer interface of the network communications interface sub-stack exists; and if the expected type of sub-layer interface is determined not to exist, then causing a pseudo-driver to create a sub-layer interface of the expected type and populating a network management information base with a sub-layer interface entry, the management information base being stored in memory of the network communications device so as to be accessible to network management client applications performing network management functions with respect to the network communications device, the sub-layer interface entry including (1)respective instance and type identifiers of the sub-layer interface and (2)one or more operational attributes of the sub-layer interface, the value of each operational attribute identically mirroring the value of a corresponding operational attribute of the interface sub-stack as reflected in the non-standardized network-management representation.

16. A computer program product according to claim 15, wherein the method is performed by an interface manager in conjunction with drivers including a real driver and the pseudo driver, the real driver being associated with the overall network communications interface sub-stack which effects the transfer of data communications packets in a network, the pseudo driver being associated with the sub-layer interface which does not effect the transfer of data communications packets in the network, and wherein:

the signature is provided to the interface manager by the real driver as part of registering the network communications interface sub-stack with the interface manager;

the creating of the sub-layer interface (1)is performed by the pseudo driver in response to a request from the interface manager, and (2)includes registering the sub-layer interface with the interface manager; and the populating of the network management information base is performed by the interface manager as part of the registering of the sub-layer interface by the pseudo driver.

17. A computer program product according to claim 16, wherein:

the sub-layer interface is a first sub-layer interface and the populating of the network management information base is performed by a first invocation of a reentrant procedure of the interface manager; and the determining, creating and populating are also performed for a second sub-layer interface of the network communications interface sub-stack, the populating for the second sub-layer interface being performed by a second invocation of the reentrant procedure of the interface manager nested within the performing of the first invocation of the reentrant procedure.

18. A computer program product according to claim 16, wherein the interface manager includes a common part and an extension part whose operation is specific to a type of the sub-layer interface, and wherein the request from the interface manager for the creating of the sub-layer interface is made by the extension part in response to a command from the common part.

19. A computer program product according to claim 16, wherein the standardized network-management representation of the multiple-layer network communications interface is accessed by network management clients via client services provided by the interface manager, and wherein the value of each operational attribute of the sub-layer interface is made to identically mirror the value of the corresponding operational attribute of the interface sub-stack as reflected in the non-standardized network-management representation by the pseudo driver accessing, via the client services of the interface manager, data maintained by the real driver.

20. A computer program product according to claim 16, wherein the value of each operational attribute of the sub-layer interface is made to identically mirror the value of the corresponding operational attribute of the interface sub-stack as reflected in the non-standardized network-management representation by the pseudo driver directly interacting with the real driver to access data maintained by the real driver.

\* \* \* \* \*